3,505,229
GREASE COMPOSITION
John Tevlin Skehan, Claymont, Wilmington, Del., assignor to E. I. du Pont de Nemours and Company, Wilmington, Del., a corporation of Delaware
No Drawing. Continuation-in-part of application Ser. No. 440,917, Mar. 18, 1965. This application Dec. 5, 1967, Ser. No. 688,028
Int. Cl. C10m 7/28, 7/16, 7/30
U.S. Cl. 252—54          8 Claims

ABSTRACT OF THE DISCLOSURE

Greases containing a perfluorinated polyether oil derived from hexafluoropropylene oxide and about 5 to 50% by weight of a polymer of tetrafluoroethylene as thickener. The grease may be applied as a fluid dispersion in a suitable volatile solvent such as 1,2-dibromo-1,1,2,2-tetrafluoroethane or 1,1,2-trichloro-1,2,2-trifluoroethane.

---

This is a continuation-in-part of U.S. application Ser. No. 440,917, filed Mar. 18, 1965, and now abandoned.

This invention is directed to high temperature greases which consist of tetrafluoroethylene polymers as thickeners and perfluorinated polyethers as the base oils.

There is a great need at the present time for greases which are stable and useful at temperatures in excess of 400° F. (200° C.) and which remain useful at temperatures near 0° F. (−17° C.), which are also inert to hydrocarbon fuels, oxidizing agents, reducing agents and which do not corrode metallic materials of construction. For example, military specification MIL-G-27617 (USAF), issued Nov. 26, 1962, sets forth the requirements for a grease desired by the military. At the present time, there are no greases available which meet the requirements of this military specification. It is, therefore, an object of the present invention to provide a novel grease which fills the needs of the above designated military specification.

These and other objects of the invention will be apparent from the following description and claims.

More specifically, the present invention is directed to a grease composition which comprises (a) a grease containing—
    (1) as base oil, a perfluorinated polyether having a structure selected from the group consisting of $R_fO[CF(CF_3)CF_2O]_nCF(CF_3)F$, $R_fO[CF(CF_3)CF_2O]_nCF(CF_3)H$ and $$R_fO[CF(CF_3)CF_2O]_nCF(CF_3)$$
$$CF(CF_3)[OCF_2CF(CF_3)]_nOR_f$$

where $R_f$ is a perfluoroalkyl group and $n$ indicates the degree of polymerization and having a maximum volatility of 50% at 400° F. according to Federal Test Method Standard FTMS-791, Method 351, and a maximum pour point of 50° F., and
    (2) as thickener, about 5 to 50%, based on the weight of grease component (a), of a polymer of tetrafluoroethylene containing at least 85% by weight —$CF_2CF_2$— units, and having a molecular weight of at least 2,000, and (b) about 0 to 70%, based on the weight of the total composition, of a volatile liquid solvent for the perfluorinated polyether.

Preferred classes are those containing perfluorinated polyethers of molecular weights within the range 3000 to 13,000 and tetrafluoroethylene polymers of molecular weights within the range of 35,000 to 50,000. Preferred polymers are those containing 90% or more tetrafluoroethylene units.

The greases of this invention are prepared by thickening a perfluorinated polymer derived from hexafluoropropylene oxide with a tetrafluoroethylene polymer. The amount of thickener required depends on the specific oil being used and the grade of grease desired. In general, greases are rated according to National Lubricating Grease. Institute grade, ranging from 0 to 6. The grease grade is determined by Test Method ASTM-D-217-52T. For grade 0 classes approximately 5% of the tetrafluoroethylene polymer thickener is required. For grade 6 classes as much as 50% of the tetrafluoroethylene polymer thickener may be required. For intermediate grades, of course, the amount of tetrafluoroethylene polymer thickener ranges between these two extremes.

The tetrafluoroethylene polymers utilized as thickeners are, broadly, any polymer, copolymer or telomer containing at least 85% by weight tetrafluoroethylene and having a molecular weight of greater than 2000. Preferably, these polymers fall into three classes:

(1) Tetrafluoroethylene homopolymers, e.g., "Teflon," usually having high molecular weight, or pyrolysis products thereof having molecular weights greater than 2000. Such polymers are essentially 100% tetrafluoroethylene units.

(2) Tetrafluoroethylene - hexafluoropropylene (HEP) copolymers containing at least 85% tetrafluoroethylene units by weight. These are usually relatively high molecular weight copolymers.

(3) Tetrafluoroethylene telomers of structure $$X(CF_2CF_2)_nY$$

having molecular weights of greater than 2000. In the molecular weight range cited, these telomers are greater than 85% by weight tetrafluoroethylene and almost always greater than 90% tetrafluoroethylene. In the formula the groups X and Y are derived from a molecule X—Y (a telogen). The terms telogen and telomer are defined in U.S. Patent 2,440,800. Tetrafluoroethylene telomers are prepared by causing tetrafluoroethylene to polymerize in the presence of X—Y, the elements of X—Y being incorporated into the telomer. The molecule X—Y must be cleavable under the polymerization conditions and may vary widely. Examples of classes of telogens X—Y include aliphatic hydrocarbons (X=H, Y=hydrocarbon residue), aliphatic ethers containing an α-hydrogen (X=H, Y=ether residue), tertiary amines (X=H, Y=amine residue), aliphatic alcohols (X=H, Y=alcohol residue), mercaptans (X=H, Y=mercaptan residue), disulfides (X=Y=RS—), aliphatic carbonyl compounds containing α-hydrogen (aldehydes, ketones, diketones, keto-acids, ketonitriles, acids; X=H, Y=residue of carbonyl compound), dialkylamides (X=H, Y=amide residue), aliphatic halohydrocarbons containing halogen other than fluorine (X=halogen, Y=residue). Mixtures of telogens may also be used. In addition to the patents cited herein, British Patent 583,874 sets forth an extensive disclosure of tetrafluoroethylene telomers whiah may be utilized.

Examples of useful telogens are: butane, isobutane, methylcyclohexane, 2,3-dimethylbutane, tetrahydrofuran, diethylether, dioxane, trimethylamine, triethylamine, methanol, ethanol, isopropanol, sec.-butanol, cyclohexanol, ethyl mercaptan, butyl mercaptan, dodecyl mercaptan, dimethyl disulfide, diethyl disulfide, dibutyl disulfide, acetaldehyde, propionaldehyde, butyl aldehyde, acetone, butanone, 2,4-pentanedione, ethyl acetoacetate, acetic acid, butyric acid, ethyl acetate, dimethyl formamide, dimethyl acetamide, carbon tetrachloride, chloroform, bromoform, methyl chloride, hexachloroethane, monofluorotrichloromethane, trichlorotrifluoroethane, difluorotetrachloroethane and the like.

The base oils used in the present greases are perfluorinated polyethers derived from hexafluoropropylene oxide. Such oils are prepared by first polymerizing hexafluoropropylene oxide, either alone or in the presence of carbonyl fluoride, a perfluoro acid fluoride or a perfluoro ketone, using certain fluoride ion-containing catalysts or charcoal as taught in Canadian Patents 701,654, 707,359, 707,360, 707,361 and 725,740, and U.S. Patent 3,274,239 to obtain hexafluoropropylene oxide polymers of the structure:

$$R_fO[CF(CF_3)CF_2O]_nCF(CF_3)COF$$

where $R_f$ is a perfluoroalkyl group and $n$ ranges from 0 to 100. These polymers are readily hydrolyzed in the presence of water to the corresponding acids of the structure:

$$R_fO[CF(CF_3)CF_2O]_nCF(CF_3)COOH$$

These acids are converted to perfluorinated polyethers by reaction with elemental fluorine according to the procedure of Canadian Patent 844,290 and U.S. Patent 3,242,218 to give products of the structure:

$$R_fO[CF(CF_3)CF_2O]_nCF(CF_3)F$$

These polymers may also be converted to perfluorinated polyethers by ultraviolet light coupling with the elimination of the COF group as taught in U.S. Patent 3,214,478 to form oils of the structure:

$$R_fO[CF(CF_3)CF_2O]_nCF(CF_3)CF(CF_3)[OCF_2CF(CF_3)]_nOR_f$$

The hexafluoropropylene oxide polymers may also be converted to products containing a single hydrogen of the structure:

$$R_fO[CF(CF_3)CF_2O]_nCF(CF_3)H$$

as taught in Canadian Patent 721,328, but the presence of the hydrogen causes the resulting greases to be less desirable than those derived from the perfluorinated ethers.

As indicated above, the hexafluoropropylene oxide polymers may vary from low molecular weight products to very high molecular weight products. To be useful in the present invention, the perfluorinated polyethers must be chosen from this broader class of compounds to meet the requirements of volatility and pour point which are necessary to obtain useful greases. The oils must have a maximum volatility of 50% at 400° F. (204.4° C.) as determined by Federal Test Method FTMS–791, Method 351 and a maximum pour point of 50° F. (10° C.) as determined by ASTM–D–97. Within this class it has been found that oils having molecular weights of 3,000 to 13,000 are preferable. Of course, the polymerization methods give mixtures of products so that the molecular weights are an average. Although a pure product having a specific molecular weight may be used, mixtures of prdoucts are equally useful if the variation in molecular weight is not too large. Usually, the most volatile lower molecular weight materials are removed from oils before use.

Oils having volatilities greater than that specified above are not useful in the present greases because the resulting greases do not have the service life required. Oils having pour points greater than 50° F. are not useful because, under many startup conditions, the derived greases would be too thick to provide lubrication before the bearings or the like had heated sufficiently to soften the grease.

The thickeners are polymers of tetrafluoroethylene containing at least 85% —$CF_2CF_2$— units having molecular weights of at least 2,000. The polymers should have melting points of at least 500° F. (260° C.) and preferably near or above 570° F. (300° C.). These tetrafluoroethylene polymers can range from the lower molecular weight polymers usually called telomers to the ultra-high molecular weight polytetrafluoroethylene such as is sold under the trade name of "Teflon." The telomers tetrafluoroethylene are manufactured by polymerization of tetrafluoroethylene in the presence of a chain transfer agent (telogen) such as is taught in U.S. Patents 2,411,158; 2,433,844; 2,443,003; 2,540,088; 2,562,547; 3,019,261 and 3,067,262. The molecular weight of the telomers depends primarily on the activity of the telogen. Relatively active telogens such as described in U.S. Patent 3,067,262 give lower molecular weight telomers. Relatively inactive telogens such as, for example, trichlorotrifluoroethane give higher molecular weight telomers. Ultra-high molecular weight polytetrafluoroethylene, prepared by an aqueous emulsion polymerization usually has a molecular weight in excess of 1,000,000. Such high molecular weight polymers are described in U.S. Patents 2,230,654; 2,534,058; 2,559,750; 2,559,752; 2,612,484; 2,662,065; 3,047,553 and 3,063,922. The copolymers of tetrafluoroethylene and hexafluoropropylene containing less than 15% by weight hexafluoropropylene as described in U.S. Patent 3,047,553 are also useful. The degradation products of high molecular weight polytetrafluoroethylene, prepared according to U.S. Patent 2,496,978 are also useful if they possess the required melting point characteristics.

The tetrafluoroethylene polymers must contain at least 85% by weight tetrafluoroethylene units. Polymers containing less than this amount of tetrafluoroethylene are either too unstable or are otherwise unuseful in the present greases. The preferred polymers contain 90% or more tetafluoroethylene units.

The present greases are prepared by mixing the solid tetrafluoroethylene polymer and the oil by any convenient means. The polymers should be finely divided in the grease. This is usually accomplished by preparing the grease in an ink mill, grease mill, homogenizer or the like which subdivides the solid particles during the process. If the tetrafluoroethylene polymer is obtained as a dispersion in a volatile medium such as 1,1,2-trichloro-1,2,2-trifluoroethane, it is often convenient to combine such dispersion with the oil and then remove the volatile medium by vacuum stripping or other similar means for removing such materials.

The greases of this invention may be applied to the piece to be lubricated in any conventional manner. When it is desired to avoid the application of an excessive amount of grease, the grease can be applied as a fluid dispersion containing the polymer of tetrafluoroethylene dispersed in the perfluorinated polyether and a volatile liquid solvent for the perfluorinated polyether. Suitable means for applying the dispersion include spraying, painting, dipping, injection, and the like. After the dispersion has been applied, the volatile solvent is evaporated leaving the desired coating of grease on the piece. Suitable means of evaporation include vacuum evaporation, evaporation at room temperature and pressure, and the like.

A preferred grease composition for applying the grease as a fluid dispersion comprises (a) a grease containing—
  (1) as base oil, a perfluorinated polyether having a structure selected from the group consisting of $$R_fO[CF(CF_3)CF_2O]_nCF(CF_3)F$$

$$R_fO[CF(CF_3)CF_2O]_nCF(CF_3)H$$

and $$R_fO[CF(CF_3)CF_2O]_nCF(CF_3)CF(CF_3)[OCF_2CF(CF_3)]_nOR_f$$

where $R_f$ is a perfluoroalkyl group and $n$ indicates the degree of polymerization and having a maximum volatility of 50% at 400° F. according to Federal Test Method Standard FTMS–791, Method 351, and a maximum pour point of 50° F.; and (2) as thickener, 5 to 50%, based on the weight of grease component (a), of a polymer of tetrafluoroethylene containing at least 85% by weight —$CF_2CF_2$— units and having a molecular weight of at least 2,000, and (b) 40 to 70%, based on the weight of the total composition, of a volatile liquid solvent for the perfluorinated polyether. The preferred solvents are 1,2-dibromo-1,1,2,2-tetrafluoroethane and 1,1,2-trichloro-1,2,2-trifluoroethane. When less than about 40% by weight of volatile solvent is present the dispersion is too viscous to be applied in thin coatings and does not flow easily and rapidly into small crevices. The use of more than about 70% by weight of volatile solvent serves no useful purpose.

The preferred oils for use in this invention are those having molecular weights of 3000 to 13,000 and particularly 3000 to 6000. The preferred tetrafluoroethylene polymers are those having molecular weights of 35,000 to 50,000. The most preferred tetrafluoroethylene polymer is the telomer of tetrafluoroethylene and trichlorotrifluoroethane having a molecular weight of 35,000 to 50,000. These molecular weight designations are based upon number average molecular weights obtained by the spectroscopic method.

The greases of this invention have a technically advantageous combination of properties. They are useful at relatively low temperatures as lubricants and by proper choice of base oil and thickener can be devised to be useful at well below 0° F. All of the greases of this invention are useful at temperatures in excess of 400° F. (204° C.) which sets them out from other greases. Greases within the scope of this invention have been found to operate for over 1,000 hours at 400° F. The preferred types operate for over 2,000 hours at 500° F. (260° C.) and operate for considerable periods of time at temperatures as high as 600° F. (316° C.)

The novel greases of this invention have a number of other useful properties not possessed by other greases. For example, Messina, in an article published in the National Lubricating Grease Institute Spokesman for September 1963, reported a series of tests that a grease must pass to be useful in rocket motors. The greases must be inert to ethyl alcohol, JP-4 jet fuel, diethylenetriamine, unsymm.-dimethylhydrazine, mixtures of the hydrazine and triamine, mixtures of the dimethylhydrazine with hydrazine itself, hydrogen peroxide, inhibited red fuming nitric acid and nitrogen tetraoxide. The greases of this invention are inert to all these materials according to the test methods described by Messina. Only one grease described by Messina, a 20% polytetrafluoroethylene, 80% perfluorotrialkylamine grease behaved similarly. As Messina pointed out, however, this was not a useful grease since it was too volatile and could not be used at temperatures even up to 400° F. Messina was unable to obtain any nonvolatile greases containing polytetrafluoroethylene.

Messina also described impacted compatibility tests with liquid oxygen and nitrogen tetraoxide, reactivity tests with metals at high shear and other tests of interest. The present greases meet the requirements of all the tests described by Messina.

MIL Specification MIL-G-27617 (USAF) sets out the requirements for greases to be used at temperatures of 400° F. or above. For example, the specification requires continuous usefulness in ball bearings at 400° F. for at least 400 hours under the test conditions described in Federal Test Method, FTMS-791, Method 333, sometimes known as the "Pope Spindle Test." The greases described by Messina would not pass this test due to their high volatility.

The greases of this invention provide a unique combination of properties such as lubricity at both high and low temperatures, nonreactivity with metals, resistance to air oxidation and reaction with such severe reactants as oxygen, hydrazines, fuming nitric acid and nitrogen tetraoxide. These greases also have advantageous extreme pressure lubricating properties. This combination of properties makes the greases of this invention useful under conditions which occur in jet planes for use in aircraft having maximum speeds in excess of speed of sound, missile systems and other similar situations where resistance to high temperatures, oxidizing conditions or contact with other extremely corrosive materials is required. They are useful for lubricating ball bearings, roller bearings, needle bearings and the like where oil lubrication of such bearings is not possible due to their location. Such bearings are of course well known in the art. These greases can, of course, be used under conditions where presently available greases are useful but have the added advantage of being useful in situations where no other greases will survive.

Representative examples further illustrating the present invention follow.

EXAMPLE I

A dispersion (7.5% by weight in 1,1,2-trichloro-1,2,2-trifluoroethylene) of a telomer of tetrafluoroethylene and 1,1,2-trichloro-1,2,2-trifluoroethane (1 kilogram) was added to 500 g. of a hexafluoropropylene oxide polymer. The trichlorotrifluoroethane was evaporated at 117° F. (47.2° C.) with rapid mechanical agitation. The mixture was then passed through an 8-inch (20.3 cm.) 3-roll ink mill with a roller clearance of 0.0015 inch (38 microns). After three passes, the last traces of trichlorotrifluoroethane were removed by spreading the mixture in a thin layer on trays in a vacuum oven at 120° F. (54.4° C.) and 10-inch (254 mm.) Hg vacuum. Finally, the mixture was passed through the ink mill an additional 10 times. The resultant product was a smooth, buttery NLGI grade 2 grease containing 13% telomer. The grease had the following properties: consistency mm./10 at 77° F. unworked 276, worked 292, mechanical stability after six hours Shell Roll Test 325, water loss 2.2% at 100° F. (FTMS-791-3252), high temperature bearing test (FTMS-791-333) greater than 2000 hours at 500° F. and 10,000 r.p.m., greater than 650 hours at 550° F., and greater than 60 hours at 600° F., no oxygen takeup in the oxidation stability test ASTM-D-942 at 210° F., no copper corrosion in FTMS-791-5309, passed the liquid oxygen and nitrogen tetraoxide impact tests described in USAF Spec. Bulletin 527.

The tetrafluoroethylene/trichlorotrifluoroethane telomer was prepared using the procedure of Example 2 of U.S. Patent 3,067,262, omitting the methylcyclohexane, at 150° C. and 600 p.s.i.g. The following mole ratios were maintained: 0.081 mole tetrafluoroethylene/mole trichlorotrifluoroethane, 0.0014 mole di-tert-butyl peroxide/mole trichlorotrifluoroethane. The tetrafluoroethylene telomer had a crystalline melting point of 323–327° C. and an average molecular weight of 35,000 to 50,000.

The hexafluoropropylene oxide polymer was prepared by polymerizing hexafluoropropylene oxide according to the procedure of Canadian Patent 725,740 to a product of structure

$C_3F_7O[CF(CF_3)CF_2O]_nCF(CF_3)COF$ which was then coupled according to the procedure of U.S. Patent No. 3,214,748 with ultraviolet light to a product predominantly of structure

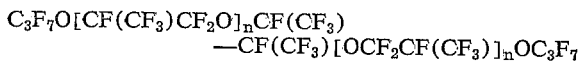
$C_3F_7O[CF(CF_3)CF_2O]_nCF(CF_3)$
  $—CF(CF_3)[OCF_2CF(CF_3)]_nOC_3F_7$ having an average molecular weight of 6230, a pour point of −30° F. (−34.4° C.), a 100° F. viscosity of 309 centistokes, a 400° F. viscosity of 3.86 centistokes and a volatility of 1.9% after six and one-half hours at 500° F. (ASTM-D-972, FTMS-Method 351.2).

EXAMPLE II

A grease was prepared using the procedure of Example I from 257 g. of a 7.0% (weight) dispersion of the tetrafluoroethylene-1,1,2-trichloro-1,2,2-trifluoroethane telomer of Example I in trichlorotrifluoroethane and 102 g. of a hexafluoropropylene oxide polymer. After milling and removing the trichlorotrifluoroethane as in Example I, the resulting grease, containing 15% telomer, was a smooth, buttery product of NLGI grade 2 with a worked ASTM consistency of 271 mm./10 (ASTM–D–1403).

The grease operated for greater than 1,000 hours at 400° F. and 10,000 r.p.m. in the bearing performance test FTMS–791–333 and had a −30° F. torque of 1840 gram cm. starting and 800 gram cm. running.

The hexafluoropropylene oxide polymer was prepared by polymerizing hexafluoropropylene oxide as in Example I, then replacing the terminal acid fluoride group with fluorine according to the procedure of U.S. Patent 3,242,218. The resulting polymer of structure

had an average molecular weight of 3130, a pour point of −50° F. (−45.6° C.), a 100° F. viscosity of 72 centistokes, a 400° F. viscosity of 1.58 centistokes, a volatility of 14.7% at 400° F. and 53.4% at 500° F., both after six and one-half hours (ASTM–D–972, FTMS-Method 351.2).

EXAMPLE III

A grease was prepared using the procedure of Example I from 185 grams of the tetrafluoroethylene telomer dispersion of Example 2 and 85 grams of hexafluoropropylene oxide polymer. After milling and removing the trichlorotrifluoroethane as in Example I, a smooth, buttery NLGI grade 2 grease was obtained containing 12% telomer with a worked ASTM consistency of 290 mm./10 (ASTM–D–1403).

This grease would perform in an equivalent manner to that of Example I in the Ball Bearing Performance Test at 10,000 r.p.m. and 500° F. (FTMS–791–333).

The hexafluoropropylene oxide polymer, prepared in the same manner as that of Example I, had an average molecular weight of 13,000, a pour point of −5° F. (−20.6° C.), a 100° F. viscosity of 1307 centistokes, a 400° F. viscosity of 12.33 centistokes, a volatility at 500° F. of 0.07% after six and one-half hours (ASTM–D–972, FTMS-Method 351.2).

EXAMPLE IV

A grease was prepared using the procedure of Example I from 50.33 lbs. (22.8 kgram) of a 7.15% dispersion of the tetrafluoroethylene telomer of Example I in 1,1,2-trichloro-1,2,2-trifluoroethane and 21.75 lbs. (9.87 kgram) of a hexafluoropropylene oxide polymer. After removal of the trichlorotrifluoroethane as in Example I, the mixture was passed three times through a Manton-Gaulin homogenizer with a single stage valve operating at 8500±200 p.s.i. The remaining trichlorotrifluoroethane was then removed in a vacuum oven. The product was a smooth, buttery NLGI grade 2 grease containing 14.2% telomer, with an unworked ASTM consistency of 271 mm./10, worked consistency of 279 mm./10 (ASTM–D–1403). The grease had a mechanical stability of 314 after 100,000 strokes, 335 after six hours Shell Roll Test, an evaporation loss of 1.6% after 22 hours at 500° F. (FTMS–791–351), was essentially equivalent to the grease of Example I in the high temperature bearing performance test (FTMS–791–333) at 10,000 r.p.m. had a dielectric breakdown voltage of 43.6 kilowatts (ASTM–D–877), passed the copper corrosion test FTMS–791–5309, a −30° F. torque of 5770 gm. cm. starting and 1670 gm. cm. running (FTMS–791–334) and a high temperature bearing performance of greater than 500 hours at 400° F. at 20,000 r.p.m. (FTMS–791–333 modified).

The hexafluoropropylene oxide polymer was prepared in the same manner and was very similar to that of Example I, average molecular weight 6140, pour point −20° F. (−28.9° C.), viscosity at 100° F. of 281 centistokes, viscosity at 400° F. of 3.63 centistokes, and a volatility of 3.2% at 500° F. after 6½ hours (ASTM–D–972, FTMS-Method 351.2).

EXAMPLE V

A grease was prepared using the procedure of Example I from 40 grams of a 20% dispersion of a tetrafluoroethylene-methylcyclohexane telomer in 1,1,2-trichloro-1,2,2-trifluoroethane and 35 grams of a hexafluoropropylene oxide polymer. After milling and removing trichlorotrifluoroethane as in Example I, the product, containing 18.6% telomer, was a smooth, buttery NLGI grade 2 grease with an ASTM worked consistency of 268 mm./10 (ASTM–D–1403).

The tetrafluoroethylene telomer was prepared by repeating Example 2 of U.S. Patent 3,067,262, average molecular weight 3,000, crystalline melting point 298° C. The hexafluoropropylene oxide polymer was prepared in the same manner and was very near to that of Example I, average molecular weight 6,050, pour point −25° F. (−32° C.), 100° F. viscosity 286 centistokes, 400° F. viscosity 3.68 centistokes, and a volatility of 4.5% at 500° F. and six and one-half hours (ASTM–D–972, FTMS-Method 351.2).

EXAMPLE VI

A grease was prepared by combining 7.5 grams of the dry tetrafluoroethylene telomer of Example I (obtained by evaporation of the trichlorotrifluoroethane to dryness) with 42.5 grams of the hexafluoropropylene oxide polymer of Example V. The mixture was passed through the ink mill described in Example I 14 times, giving a smooth, buttery NLGI grade 1 grease, containing 15% tetrafluoroethylene telomer with an ASTM unworked consistency of 307 mm./10, worked 311 mm./10 (ASTM-D–1403).

EXAMPLE VII

A grease was prepared by adding 12.5 grams of high molecular weight polytetrafluoroethylene molding powder ("Teflon-7," Du Pont, molecular weight >1,000,000) to 37.5 grams of hexafluoropropylene oxide polymer of Example V. The mixture was passed through the ink mill of Example I 14 times, giving a fibrous NLGI grade 1 grease with an ASTM worked consistency of 314 mm./10 (ASTM–D–1403).

EXAMPLE VIII

A fluid dispersion of a grease was prepared by adding 544 parts by weight of a dispersion (7.4% by weight of the telomer of Example I in 1,1,2-trichloro-1,2,2-trifluoroethane) to 227 parts by weight of the hexafluoropropylene oxide polymer of Example I and agitating the resulting slurry in laboratory glassware at room temperature (about 25° C.) for about an hour. The resulting composition had the appearance of a translucent, bluish, homogeneous dispersion.

Flat test pieces of SAE 1020 mild steel about 75 x 13 x 3 mm. in dimension were sanded until free of visible surface imperfections, and manually dipped four or five seconds into the above composition. Upon drying in air for about 16 hours at about 23 to 27° C., a uniform coating of grease adhered to the surface of the test pieces. Another set of steel test pieces similarly dipped into the composition were dried for an hour in a vacuum oven at about 60° C. and at about 230 mm. of mercury, absolute pressure. Again a uniform coating of grease adhered to the surface of the test pieces.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. A grease consisting essentially of an oil containing from about 5% to about 50% by weight of a thickener, said oil being a perfluorinated polyether having a structure selected from the group consisting of $$R_fO[CF(CF_3)CF_2O]_nCF(CF_3)F$$

$$R_fO[CF(CF_3)CF_2O]_nCF(CF_3)H, \text{ and}$$

$$R_fO[CF(CF_3)CF_2O]_nCF(CF_3)CF(CF_3)[OCF_2CF(CF_3)]_nOR_f$$

where $R_f$ is a perfluoroalkyl group and $n$ indicates the degree of polymerization, having a maximum volatility of 50% at 400° F. acording to Federal Test Method Standard FTMS–791, Method 351, and having a maximum pour point of 50° F., said thickener being a polymer of tetrafluoroethylene containing at least 85% by weight —$CF_2CF_2$— units and having a molecular weight of at least 2,000.

2. The grease according to claim 1 wherein said perfluorinated polyether is of the structure $$R_fO[CF(CF_3)CF_2O]_nCF(CF_3)F$$

and has a molecular weight within the range 3,000 to 13,000, and said tetrafluoroethylene polymer has a molecular weight within the range 35,000 to 50,000.

3. The grease according to claim 1 wherein said tetrafluoroethylene polymer contains at least 90% by weight —$CF_2CF_2$— units.

4. The grease according to claim 2 wherein said perfluorinated polyether has a molecular weight within the range 3,000 to 6,000.

5. The grease according to claim 1 and which contains up to 70 weight percent of a volatile liquid solvent for the perfluorinated polyether.

6. The grease according to claim 5, as a fluid dispersion, and which contains 40 to 70% of said solvent.

7. The grease according to claim 6 wherein the solvent is 1,2-dibromo-1,1,2,2-tetrafluoroethane.

8. The grease according to claim 6 wherein the solvent is 1,1,2-trichloro-1,2,2-trifluoroethane.

References Cited

UNITED STATES PATENTS

| | | | |
|---|---|---|---|
| 3,214,478 | 10/1965 | Milian | 252—54 |
| 3,242,218 | 3/1966 | Miller | 252—54 |
| 3,248,326 | 4/1966 | Swenson | 252—58 |
| 3,262,879 | 7/1966 | Messina | 252—58 |
| 3,342,875 | 9/1967 | Selman et al. | 252—54 |

DANIEL E. WYMAN, Primary Examiner

I. VAUGHN, Assistant Examiner

U.S. Cl. X.R.

252—58